US006445276B2

(12) United States Patent
Schön et al.

(10) Patent No.: US 6,445,276 B2
(45) **Date of Patent: *Sep. 3, 2002**

(54) ELECTRICAL FUSE FOR USE IN MOTOR VEHICLES

(75) Inventors: Uwe Schön, Neunkirchen; Dieter Bornhorst, Stockach; Joachim Korherr, Orsingen; Joachim Jüngst, Karlsruhe, all of (DE)

(73) Assignee: TRW Automotive Electronics & Components GmbH & Co. KG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,475

(22) Filed: Mar. 4, 1999

(30) Foreign Application Priority Data

Mar. 4, 1998 (DE) ........................................ 198 09 149

(51) Int. Cl.[7] ...................... H01H 85/055; H01H 85/36; H02H 5/10; H02H 3/08

(52) U.S. Cl. ...................... 337/184; 337/183; 337/195; 337/405; 337/407; 307/10.7; 307/131; 180/279; 361/57; 361/87; 361/104; 361/211

(58) Field of Search ................................ 337/153, 157, 337/178, 182–184, 195, 401, 405, 407; 307/9.1–10.8, 119, 125, 131; 180/271, 274, 279, 281–283; 200/61.08; 361/54, 57, 87, 115, 104, 211; 280/727

(56) References Cited

U.S. PATENT DOCUMENTS

| | | | | | |
|---|---|---|---|---|---|
| 2,300,142 | A | * | 10/1942 | Wood | 337/164 |
| 3,763,454 | A | * | 10/1973 | Zandonatti | 337/404 |
| 3,931,602 | A | * | 1/1976 | Plasko | 337/163 |
| 3,958,206 | A | * | 5/1976 | Klint | 337/406 |
| 4,451,814 | A | * | 5/1984 | Barry et al. | 337/407 |
| 4,494,104 | A | * | 1/1985 | Holmes | 337/403 |
| 4,677,412 | A | * | 6/1987 | Sibalis | 337/401 |
| 5,014,036 | A | * | 5/1991 | Komoto | 337/407 |
| 5,084,691 | A | | 1/1992 | Lester et al. | |
| 5,097,247 | A | * | 3/1992 | Doerrwaechter | 337/405 |
| 5,600,295 | A | * | 2/1997 | Kaufmann | 337/405 |
| 5,793,274 | A | * | 8/1998 | Kelly et al. | 337/183 |

FOREIGN PATENT DOCUMENTS

| | | | | |
|---|---|---|---|---|
| DE | 708704 | | 7/1941 | |
| DE | 32 34 826 A1 | | 3/1984 | |
| DE | 195 27 997 A1 | | 2/1997 | |
| JP | 402288126 | * | 11/1990 | H01H/37/76 |

* cited by examiner

*Primary Examiner*—Anatoly Vortman
(74) *Attorney, Agent, or Firm*—Fay, Sharpe, Fagan, Minnich & McKee, LLP

(57) ABSTRACT

A fuse apparatus (1) is provided for selectively interrupting a load current ($I_a$) flowing between a pair of associated conductor leads. The fuse apparatus includes at least two spaced apart electrically conductive contact elements (5) operatively connected with the associated conductor leads. A fuse element (7) is connected to the contact elements (5) using an electrically conductive connection material (9) to allow the current ($I_a$) to flow between the pair of associated conductor leads. The connection material (9) is adapted to electrically disconnect the fuse element (7) from the contact elements (5) when the current ($I_a$) exceeds a predetermined current intensity. The connection material (9) has an intrinsic electrical transition resistance characteristic whereby the material develops a temperature in proportion to an intensity of the current. The connection material melts as the current increases to separate the fuse element from the contact elements.

5 Claims, 2 Drawing Sheets

ELECTRICAL FUSE FOR USE IN MOTOR VEHICLES

BACKGROUND OF THE INVENTION

The subject invention is directed to the art of electrical fuses and, more particularly, to an electrical fuse that is particularly adapted for use in motor vehicle applications.

Electrical fuses of the general type under consideration are commonly used in the automotive technical field. In particular, cut-out type fuses are currently employed in many applications. Cut-out fuses are adapted to interrupt a current supplied to one or more succeeding or downstream electrical consumers by melting a fusible zone when the current exceeds the nominal rated current of the fuse.

One disadvantage of cut-out fuses, however, is that they require a high intensity of current, typically significantly above the nominal current, to flow for a relatively long period of time before the fuse melts. As a consequence, cable carrying power between the fuse and electrical consumers succeeding or downstream of the fuse must be appropriately over-dimensioned or oversized in order to avoid over-current conditions and cable fires which have the potential of endangering the motor vehicle.

In addition to the above, other problems associated with electrical fuses of the type presently available include arcing phenomenon generated by the fuses when they melt and open the circuit. The arcing can have an interfering electromagnetic effect on the motor vehicle.

Yet another problem associated with meltable fuses is that they require a method or structure for screening off the fuse in order to prevent molten metal droplets produced from the melted portion of the fuse from migrating into other electrical components or circuits where they can cause shorting or other electrical damage.

In contrast thereto, it is a primary object of the present invention to provide an electrical fuse that is particularly adapted for use in motor vehicle applications that requires practically no over-dimensioning of the succeeding or downstream electrical cables and which does not generate any electrical arcing or sparks when the current is interrupted.

SUMMARY OF THE INVENTION

The subject invention provides an electrical fuse apparatus that overcomes the above-noted problems and results in a device that interrupts electrical current without producing undesirable electric arcing or molten metal droplets that are found to be damaging in motor vehicles. Further, for all practical purposes, the subject fuse apparatus enables the use of electrical cables that are precisely sized to carry only the electrical currents that are anticipated to be required by the electrical consumers rather than oversized for carrying excess current that has been the practice in the past.

In particular, and in accordance with one aspect of the invention, there is provided a fuse apparatus for selectively interrupting a load current flowing between a pair of associated conductor leads. The fuse apparatus includes at least two spaced apart electrically conductive contact elements, a fuse element, and an electrically conductive connection material. The at least two spaced apart electrically conductive contact elements are each operatively connected with the associated electrical conductor leads. The electrically conductive connection material selectively holds the fuse element across the at least two contact elements to allow a load current to flow between the pair of associated conductor leads. In accordance with the preferred embodiment of the present invention, the connection material is adapted to electrically disconnect the fuse element from the spaced apart electrically conductive contact elements when a temperature of the connection material exceeds a predetermined threshold temperature.

In accordance with a more limited aspect of the invention, the electrically conductive connection material has an intrinsic electrical transition resistance characteristic whereby the connection material develops a temperature in proportion to an intensity of current flowing therethrough.

By connecting the fuse element to the pair of spaced apart electrically conductive contact elements using a meltable electrically conductive connection material, the connection material melts and thus separates the fuse element from the contact elements before the fuse element proper has an opportunity to possibly melt and scatter molten metal or generate electrical arcing interference. Preferably, the fuse element is a cut-out fuse of the type commonly available in the art and described above.

In accordance with a still further aspect of the invention, the electrically conductive connection material disposed between the fuse element and the pair of contact elements becomes soft at elevated temperatures and melts when its temperature exceeds a predetermined temperature. In that manner, the fuse element is separated from the contact elements without arcing or molten droplets being formed. Preferably, the predetermined temperature is reached when the current flowing through the connection material surpasses the rated current of the fuse. Overall, this results in the benefit of a substantially lower amount of heat needed for triggering the fuse. That is, the subject fuse reacts to small increases in power surpassing the rated current of the fuse. In that regard, the subject invention is more sensitive to currents that are only slightly above the rated current of the system. Thus, the drawbacks of the melting process at high temperatures typically found in fuses in the past are avoided.

In accordance with yet a still further aspect of the invention, the connection between the fuse element and the contact elements is established by means of soldering. In this manner, interruption of the load current by separation of the fuse element from the contact elements is readily obtained when the solder melts. Preferably, in accordance with the present invention, this takes place at temperatures of approximately 180°. Accordingly, any danger of producing arcing which is promoted in prior art cut-out fuses by the occurrence of high temperatures, is practically non-existent in the present invention.

According to one embodiment of the invention, the fuse element is acted upon by the force of a resilient spring element, independent of the position of the fuse, so that during the melting or softening of the connection between the fuse element and the contact elements, the fuse element is lifted or separated from the contact elements, thus interrupting the flow of load current through the fuse system.

In accordance with yet another aspect of the invention, in one embodiment, the fuse apparatus is provided with an additional heating portion. The heating portion is included to obtain an interruption in the flow of current to the electrical power consumer in the presence of a given or varying nominal current. More particularly, the heating is performed so that the immediate environment of the connections is heated between the safety element and the contact elements. In the preferred mode, heating takes place by generation of an additional current through the fuse element and through the one or several contact elements. The additional current utilized for heating, is superimposed on the load current supplied to the succeeding or downstream electrical power consumers.

For generating the additional heating current, the power consuming device can be dimensioned in such a manner that with any direct connection with a battery using the fuse, a theoretically inadmissible high current would result. More particularly, the excess current that is used for heating is discharged via a resistor which is preferably connected with one of the connection contacts or to the fuse element itself. The discharge current and heat generated thereby is preferably dissipated using a mass such as a heat sink, for example. The resistance value of the bleeder resistor through which the additional heating current flows, is used to control the temperature of the connections between the fuse element and the contact elements during normal fuse operation. Accordingly, the rated current of the fuse is established by means of the resistance value of the bleeder resistor.

In addition to the above, heating can also be performed in such a manner that the temperature of the connections or of the contact elements, or still further of the fuse element proper, is sampled or otherwise read and maintained in a closed loop control. As an alternative to the above embodiments, in accordance with yet another alternative embodiment, the ambient temperature is sampled and the heating of the fuse element and connection material is executed in accordance with the sensed ambient temperature. According to this method, the rated fuse current is obtained based on ambient temperature.

Still yet further in accordance with the present invention, the fuse is designed in such a manner that the resistance value between the connection contacts of the fuse, which is essentially determined by the intrinsic resistance values of the fuse element and/or the contact elements, is used as a shunt to generate a voltage signal and therefrom calculate the flow of current to one or more succeeding or downstream electrical current consumers. To that end, the contact elements and the connections are formed to have a desired resistance value.

In accordance with yet another aspect of the invention, in a total system for protection of electrical current consumers, the voltage drop across the subject fuse is sensed, the current flowing therethrough to the current consumers is then determined and, when the threshold current is surpassed, an active interruption element is targeted to cut off the flow of current to the consumer. In such an arrangement, the fuse is formed in such a manner that a controllable switch, such as, for example, a relay or the like, is connected with the contact element or fuse element. The controllable switch is positioned in that manner so that, if excessive threshold current is detected, targeting or control of the controllable switch is initiated in such a fashion that a major portion of the current, or its entirety, is discharged, preferably against a mass such as a heat sink or through a suitably sized bleeder resistor.

With the above form of design, there is assured on one hand, that the detected, inadmissibly high load current to the electrical power consumers is partially or completely reduced to zero. Also, there is an assurance that a high current is produced through the fuse which, in turn, leads to triggering the fuse. In this fashion, a fuse having an extremely quick reaction time is created which, furthermore, ensures an irreversible separation of the electrical current consumer from the power source.

In addition to the above, instead of the targetable electrical trigger heating, another embodiment of the invention employs a self-triggering or targetable heating element of a different type. One preferred example is a heating element based on an exothermic chemical reaction. Such an electric heating element is activated either by means of an electrical signal or by triggering an exothermic reaction that starts from a predetermined temperature. As an example, the heating element is preferably provided in the immediate vicinity of the connections between the contact elements and the fuse element so that, upon excessive rated current flowing through the fuse leading to an increased temperature, the threshold temperature of the trigger heating element is surpassed and heating is triggered or initiated. In that embodiment, even with relatively low excess of rated current, it is possible to achieve very rapid triggering of the fuse.

As can be seen from the foregoing, a primary object of the invention is to provide a fuse apparatus that separates electrical power consumers from a source of electrical power without generating electrostatic discharge caused by arcing and without producing molten metal contaminants.

A further object of the invention is to provide a fuse apparatus that enables the use of conductors having the minimum size required to meet the load demands of the electrical power consumers.

A still further object of the invention is the provision of a fuse apparatus that has a quick reaction time to interrupt the flow of excessive load current before any damage can be done to the electrical current consumers of the conductors carrying the load current.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein.

DETAILED DESCRIPTION OF THE PREFERRED EMBODIMENTS

Figure 1:
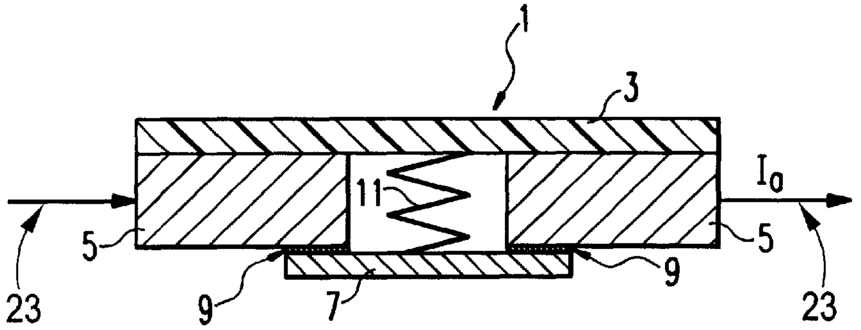
FIG. 1 is a schematic sectional representation of the subject fuse apparatus formed in accordance with a first embodiment of the invention.

Referring now to the drawings wherein the showings are for the purposes of illustrating the preferred embodiments of the invention only and not for purposes of limiting same, the overall arrangement of the preferred form of the fuse system formed in accordance with the invention for selectively interrupting a load current flowing between a pair of associated conductor leads can best be seen by referenced FIG. 1. As shown therein, the fuse apparatus 1 comprises at least two spaced apart electrically conductive contact elements 5 operatively connected with the associated conductor leads 23 and held on an electrically non-conductive carrier member 3. The electrical contact elements 5 are connected together via a fuse element 7. of particular interest and importance to the present invention is that the fuse element 7 is connected to the pair of spaced apart electrically conductive contact elements 5 by means of an electrically conductive connection material 9 arranged on opposite sides of the fuse element as shown. Preferably, the fuse element 7 is soldered to the pair of contact elements 5. The solder in the contact zones used for establishing the electrical connection between the contact elements 5 and the fuse element 7 is suitably selected based on the materials used for the contact elements and the fuse element. Preferably, the melt temperature characteristics of the solder is selected in such a manner that the softening and melting points of the connection material 9 are reached at predetermined temperatures.

It has been shown, as an example, that the normal operation temperature of the contact elements 5 and the fuse element 7 is approximately 80° C. With conventional soldering materials, the softening or melting temperature of the electrically conductive connection material 9 is approximately 180° C. As the load current $I_a$ flowing through the fuse apparatus 1 towards power consuming devices increases beyond a predetermined value, the temperature of the connection material 9 rises until it reaches a softening or melting point. When the melting point of the solder connection material 9 is reached, the electrical contact between the fuse element 7 and the contact elements 5 is interrupted, thus interrupting the flow of load current $I_a$ to the electrical power consumers downstream of the fuse.

In accordance with an aspect of the first preferred embodiment of the invention shown in FIG. 1, the fuse element 7 is acted upon by a resilient elastic spring element 11. As shown, the spring element 11 exerts a separating force between a side of the fuse element 7 facing the contact elements and the non-conductive carrier member 3. Preferably, the elastic element 11 is a screw spring which is supported on one end against the side of support member 3 facing the fuse element 7. The elastic element 11 is shown in the figures in a compressed state and is thus pre-stressed to exert a separating force between the fuse element 7 and the non-conductive carrier member 3. Thus, after reaching the softening or melting point of the solder connection material 9, the fuse element 7 is securely and permanently lifted off from contact with the electrical contact elements 5. Although not illustrated, the fuse apparatus 1 includes a specialized housing member (not shown) that is adapted to "catch" the fuse element 7 after it is separated from the electrical contact elements 5. In that case, following triggering of the fuse, the fuse element 7 becomes pressed against an internal wall of the housing and fixed in said position.

Rather than soldering the contact elements 5 with the fuse element 7, other connections are contemplated as well. The other connections are operable in response to temperature of the elements of the connections to ensure separation of the connection when the threshold temperature value is surpassed.

Figure 2:
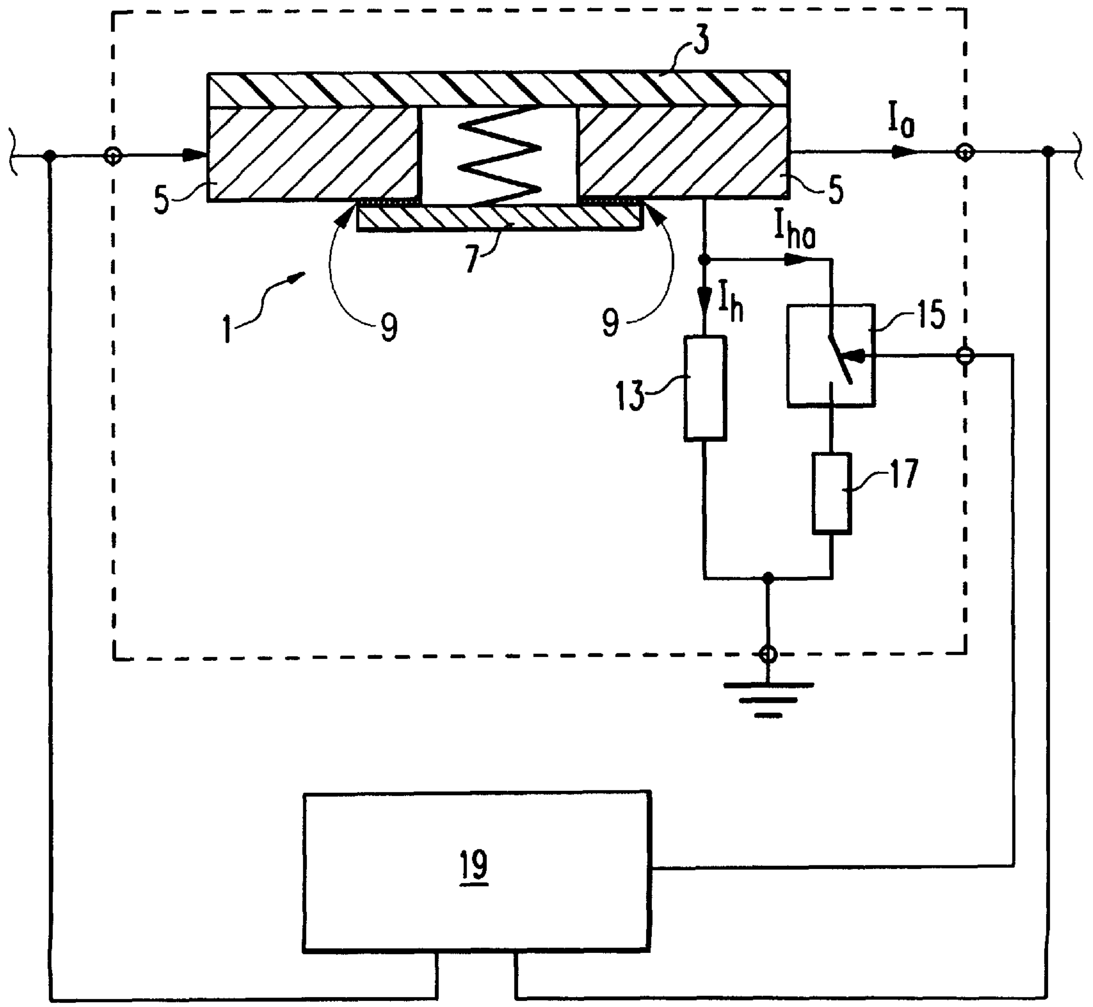
FIG. 2 is a schematic illustration, partially in section, of the fuse illustrated in FIG. 1 with an additional electrical heating portion and with an active interruption control device; and, FIG. 3 is a schematic illustration of a third embodiment of the invention showing a fuse apparatus with meltable connection material and including trigger heating elements.

With reference next to FIG. 2, a second preferred embodiment of the invention is illustrated. The second embodiment includes a heating portion that provides additional heating to the fuse component above and beyond the heating generated by the load current $I_a$, The additional heating is preferably generated by a drain current in a manner to be subsequently described below. Alternatively, the additional heating can be generated by use of external resistance heating or heating based on an exothermic chemical reaction.

In the second preferred embodiment of the invention shown in FIG. 2, a simple and cost effective heating portion is illustrated and realized by means of an additional current flow $I_h$, $I_{ha}$ through the fuse apparatus 1. To that end, the contact element 5 on the exit side of the fuse apparatus is connected to a heating current resistor 13 which conducts a heating current $I_h$ and generates heat that is discharged, preferably, through a heat sink or mass. The additional heating current $I_h$ is conducted through the subject fuse apparatus 1 in addition to and together with the load current $I_a$. The combination of the two currents causes additional warming of the contact elements 5 and/or of the fuse element 7 and the electrically conductive connection material 9 in the contact zones. The value of the heating current resistor 13 is preferably selected in such a manner that the voltage drop across the fuse apparatus 1 is not significantly adversely affected. Preferably, the voltage available at the exit side of the fuse apparatus 1 is substantially the same as the voltage value at the entry side of the fuse apparatus. Accordingly, the subject fuse apparatus poses practically no burden on the electrical power consumer.

In addition to the above considerations, the resistance value of the heating current resistor 13 is selected in such a manner that the heating current $I_h$ produced under normal operating conditions generates a predetermined temperature in the contact elements 5 and in the fuse element 7 and connection material 9. As is readily apparent, the more closely the predetermined temperature of the components of the fuse apparatus approaches or approximates the softening or melting point of the solder connection material or bonding agent 9, the lower becomes the rated current of the fuse 1. In this manner, it is possible in accordance with the present invention, to realize different current ratings with one and the same fuse through appropriate selection of the resistance value of the heating current resistor 13 alone. Furthermore, it is within the scope of the invention to provide a variable heating current resistor that is modifiable and/or controllable, such as providing a variable resistor or a small rheostat, for example, so that, based upon certain factors, the rated current of the fuse apparatus 1 can be selectively modified.

In the embodiment illustrated in FIG. 2, the heating current resistor 13 is joined in parallel to a series connection to a regulatable switch 15 and a current limiting resistor 17. The current limiting resistor 17 is selectively eliminated when the electrical connections between the respective contact element 5 and the mass or construction of the controllable switch 15 permit short circuit current to flow therethrough. In addition, the resistor can be eliminated as well when the regulatable switch 15 is provided with an appropriate internal resistance.

Preferably, in accordance with the second preferred embodiment of the invention, the regulatable switch 15 is controlled by an evaluation and control unit 19. As illustrated in the figure, the evaluation and control unit 19 is connected to both of the spaced apart electrically conductive contact elements 5 to enable the unit 19 to readily determine a voltage drop occurring across the fuse apparatus 1. As shown in the figure, the evaluation and control unit 19 calculates the amount of current flowing through the fuse apparatus 1 based upon the voltage drop across the fuse apparatus and based upon resistance value data of the materials and geometry of the contact elements 5, the fuse element 7, and the connection material 9 in the connection zones. Since the resistance value of the heating current resistor 13 is known, the heating current $I_h$ is calculated and used to determine the load current $I_a$ flowing to the electrical current consumers downstream of the subject fuse apparatus 1. In the embodiment illustrated, the evaluation and control unit 19 includes high resistance inputs and, in that way, assures that essentially none of the load current $I_a$ is consumed as a result of measuring the voltage across the fuse apparatus.

Preferably, the evaluation and control unit 19 monitors and calculates the load current $I_a$ either constantly, or at pre-established time intervals. In that way, an appropriate signal is transmitted to a controllable switch 15 when the current flowing through the fuse apparatus exceeds a pre-established threshold. The evaluation and control unit 19 triggers the controllable switch 15 when the current $I_a$ exceeds a pre-established threshold thus placing the switch 15 in a closed state. Substantially immediately after closing the switch 15, the load current $I_a$ is reduced to a value substantially below the threshold value by diverting the load current through a current limiting resistor 17 as a trigger heating current $I_{ha}$. The trigger heating current $I_{ha}$ flows through the closed switch 15 and the current limiting resistor 17 as a result of the closing of the regulatable switch 15 by the evaluation and control unit 19. The trigger heating current $I_{ha}$ together with the heating current $I_h$ causes the electrically conductive connection material 9 in the fuse apparatus to melt and thereby disconnect the fuse element 7 from at least one of the spaced apart electrically connective contact elements thus permanently and safely cutting off the power consumer from the source of current.

By selecting the resistance value of the current limiting resistor 17 in such a fashion that as a result of the trigger heating current $I_{ha}$ flowing through the switch the fuse is heated to a degree that triggering occurs, resulting in the benefit that the electrical power consumer is safely and permanently removed from the source of current.

In the embodiment illustrated in FIG. 2, the actuation of the regulatable switch 15 by the evaluation and control unit 19 ensures that the load current $I_a$ is virtually reduced to zero substantially immediately after the predetermined threshold current value is reached or exceeded. As a result of the drastic reduction in the load current $I_a$ the electric power consumer is, for all practical purposes, quickly and invisibly separated from the source of power. Further, the melting of the connection material 9 ensures that a mechanically irreversible interruption of the electric power line occurs to open the circuit between the source of current and the power consumer and maintain circuit in an opened condition. This is advantageous because the cables leading from the fuse apparatus 1 and leading to the power consumer can be reduced in size to solely accommodate the capacity of the expected load current. In the past as indicated above, the cables leading from the prior art cut-out type fuses were oversized in order to accommodate the additional current that was required to be drawn through the fuse to cause it to trip.

In yet another alternative preferred embodiment of the invention, the heating current resistor 13 is eliminated leaving only the regulatable switch 15 and the current limiting resistor 17 to draw the trigger heating current $I_{ha}$ through the connection material 9 causing the material to heat and melt. In that embodiment, the heating current resistor 13 is not used or needed to generate additional heating in the connection material 9 beyond the heat generated by the load current $I_a$.

In still yet another alternative preferred embodiment of the invention, a regulatable switch is provided in the current path leading between the subject fuse apparatus and the electrical power consumer. The series-arranged regulatable switch is adapted to interrupt the current after detecting an inadmissibly high current value. This arrangement is advantageous in applications where the electrical power consumer has a very low impedance, so that with closing of the switch in order to generate the trigger heating current $I_{ha}$, the load current $I_a$ to the consumer is not reduced to an admissible (minimum) value.

In accordance with still yet another alternative, a series-connected regulatable switch is provided for use with a fuse apparatus of the type described where external heating is applied for separating the fuse element from the contact elements. The regulatable switch is activated after detection of an inadmissible high current flowing to the power consumer.

Figure 3:
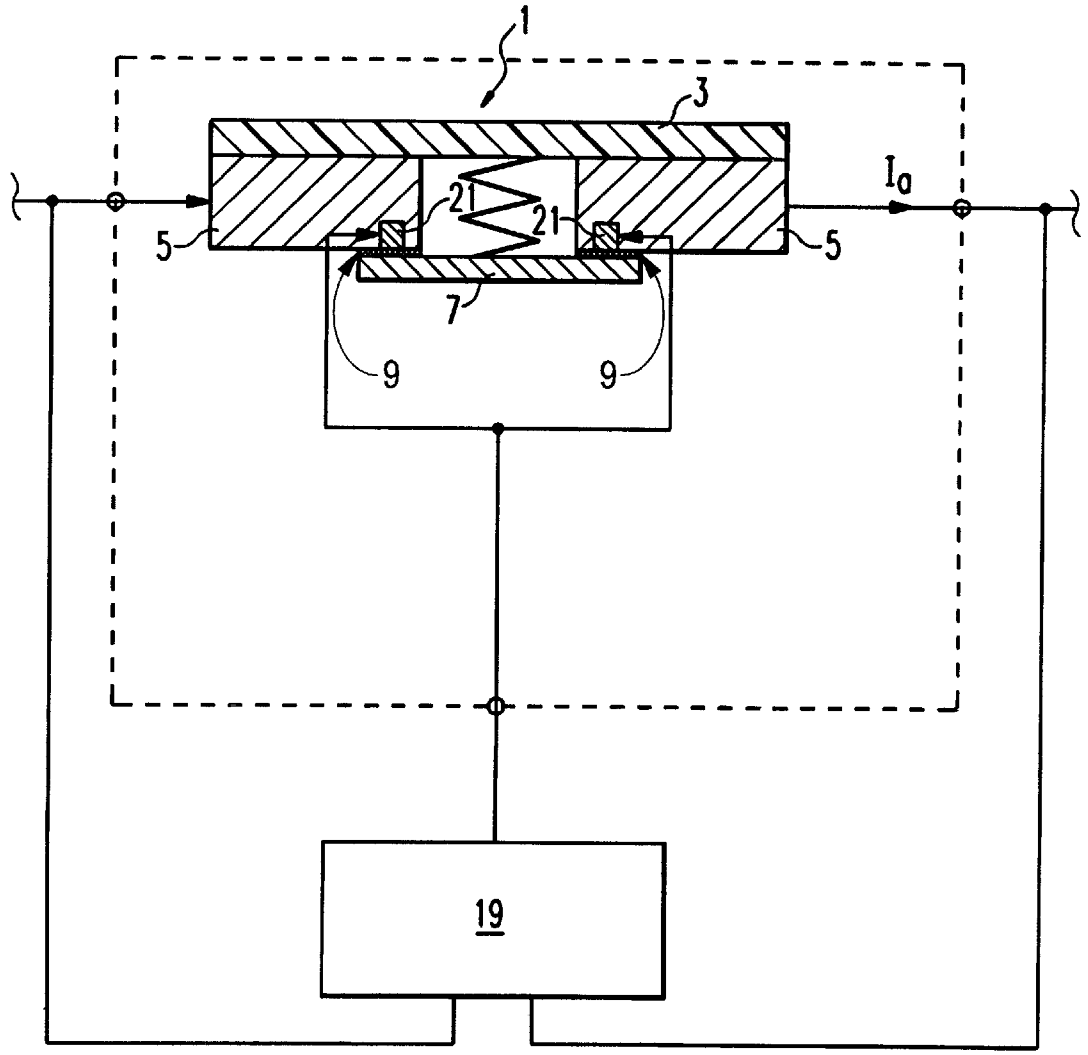

Turning now to FIG. 3, a third preferred embodiment of the present invention is illustrated wherein no additional heating is provided in order to obtain a predetermined temperature under normal operating conditions. Rather, as can be seen in that figure, a set of trigger heating elements 21 are provided in recesses formed in the contact elements 5 adjacent the electrically conductive connection material 9. As illustrated, the trigger heating elements are connected to the evaluation and control unit 19. Preferably, in accordance with the invention, the trigger heating elements are responsive to signals generated by the evaluation and control unit 19. As described above, the control unit 19 is adapted to detect the voltage drop that occurs across the fuse apparatus 1 and, using the detected voltage drop, calculate the current flowing through the fuse. When the control unit senses an abnormally high load current, the heating elements 21 are actuated to cause a rapid triggering of the fuse apparatus. The heating elements generate heat in the vicinity of the connection material 9 so that rapid triggering of the fuse (melting of the solder connection 9) is guaranteed, even when the transition resistance of the connection material 9 in the contact zones, and thus the supply of dissipated thermal energy, is relatively low.

In addition to the above, the trigger heating elements 21 can also be formed equivalently in a self-triggering configuration. As an example, materials are employed for use as the trigger heating elements which, once set in motion upon surpassing a predetermined trigger temperature, exhibit an exothermal reaction. The energy generated by the exothermal reaction is used to quickly supply the heat that is needed to trigger the fuse system.

It is to be noted that in contrast to the second preferred embodiment of the invention shown in FIG. 2, the specific embodiment illustrated in FIG. 3 provides no mechanism for assuring the interruption of the reduction of load current $I_a$ immediately after targeting the trigger heating elements 21, since the required amount of heat must first be generated in order to trigger the fuse.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A fuse apparatus for selectively interrupting a load current flowing between a pair of associated conductor leads, the fuse apparatus comprising:

at least two spaced apart electrically conductive contact elements operatively connected with the associated conductor leads;

a fuse element;

a heating portion generating a heating current through said contact elements and said fuse element to develop heat, the heating portion including a regulatable switch connected to at least one of said contact elements and responsive to a switch signal from an associated control unit to close and generate said heating current; and, an electrically conductive connection material selectively holding the fuse element across the at least two contact elements to allow the load current to flow between the pair of associated conductor leads, the connection material selectively disconnecting the fuse element from at least one of said at least two contact elements when the load current exceeds a predetermined threshold based on said heat and an ambient temperature of said fuse apparatus.

2. The fuse apparatus according to claim 1 further including an evaluation and control unit operatively connected between the pair of associated conductor leads for determining a current level of said load current and selectively generating said switch signal to close the switch when the load current exceeds said predetermined threshold.

3. The fuse apparatus according to claim 1 wherein said heating portion includes a heating current resistor connected to at least one of said electrically connected contact elements for generating said heating current.

4. The fuse apparatus according to claim 1 wherein said heating portion controls a current carrying capacity of the fuse apparatus by generating a predetermined heating current through said electrically conductive connection material.

5. The fuse apparatus according to claim 4 wherein said heating portion regulates said predetermined temperature independent of ambient temperature.

* * * * *